(12) United States Patent
Elvins et al.

(10) Patent No.: US 6,529,586 B1
(45) Date of Patent: Mar. 4, 2003

(54) SYSTEM AND METHOD FOR GATHERING, PERSONALIZED RENDERING, AND SECURE TELEPHONIC TRANSMISSION OF AUDIO DATA

(75) Inventors: T. Todd Elvins, Solana Beach, CA (US); Robert T. Fassett, Del Mar, CA (US); Philip Shinn, Los Angeles, CA (US)

(73) Assignee: Oracle Cable, Inc., Redwood Shores, CA (US)

( * ) Notice: Subject to any disclaimer, the term of this patent is extended or adjusted under 35 U.S.C. 154(b) by 247 days.

(21) Appl. No.: 09/653,472

(22) Filed: Aug. 31, 2000

(51) Int. Cl.⁷ .............................................. H04M 11/00
(52) U.S. Cl. .............................. 379/88.13; 379/88.17; 379/93.01; 379/93.25; 707/5; 707/513
(58) Field of Search ........................... 379/88.17, 88.13, 379/93.01, 93.25, 93.24; 707/5, 513

(56) References Cited

U.S. PATENT DOCUMENTS

| | | | |
|---|---|---|---|
| 4,554,418 A | 11/1985 | Toy | 179/2 |
| 4,640,992 A | 2/1987 | Rose | 379/89 |
| 4,659,877 A | 4/1987 | Dorsey et al. | 379/88 |
| 4,716,583 A | 12/1987 | Groner et al. | 379/88 |
| 4,942,616 A | 7/1990 | Linstroth et al. | 381/51 |
| 4,945,476 A | 7/1990 | Bodick et al. | 364/413.02 |
| 5,127,043 A | 6/1992 | Hunt et al. | 379/88 |
| 5,146,439 A | 9/1992 | Jachmann et al. | 369/25 |
| 5,181,107 A | 1/1993 | Rhoades | 358/86 |
| 5,187,735 A * | 2/1993 | Herrero Garcia et al. | 379/88.17 |

(List continued on next page.)

OTHER PUBLICATIONS

"My Yahoo: What is My Yahoo?" published on the World Wide Web at http://www.help.yahoo.com, dated Jun. 26, 2000, 8 pages.

"EntryPoint: Why Search, EntryPoint Delivers!" published on the World Wide Web at http://www.entrypoint.com, dated Jun. 26, 2000, 14 pages.

Hemphill et al., "Surfing the Web by Voice", Multimedia '95, Oct. 1995 pp. 215–222.

Nahm, E.R., "Speech Recognition Makes Using the Internet Easier Than Ever—Press Release", published on the World Wide Web at http://www.verbex.com, Sep. 12, 1996, pp. 1–2.

*Primary Examiner*—Fan Tsang
*Assistant Examiner*—Gerald Gauthier
(74) *Attorney, Agent, or Firm*—Park, Vaughan & Fleming LLP

(57) ABSTRACT

An audio information delivery system collects electronic data via Internet or other conveyance, and responsive to customer inquiries, selectively retrieves data from local stores in areas of interest to the inquiring customers, formats the data, and transmits the data in audio form to the customers via their telephones. Initially, an information delivery agency makes advance arrangements with remotely located content providers to repeatedly obtain information of prescribed character. Agency computers continually gather digitally stored audio and text information from the predefined content providers and assemble the gathered information into a universal database. Separately, the agency enrolls a number of individual customers, which includes obtaining each customer's preferences regarding information content and playback order. Responsive to a telephone call from a registered customer, agency's computers retrieve the caller's pre-stored preferences and proceed to identify information in the universal database that pertains to the caller's subject matter preferences. After preparing vocalizations of the text information, agency computer equipment audibly presents the audio information and vocalizations to the caller in predetermined order via the caller's telephone connection. This is achieved, for example, by using an intermediate telephone network such as a wireless carrier network.

35 Claims, 9 Drawing Sheets

U.S. PATENT DOCUMENTS

| | | | | |
|---|---|---|---|---|
| 5,193,110 A | * | 3/1993 | Jones et al. | 379/88.01 |
| 5,243,643 A | | 9/1993 | Sattar et al. | 379/88 |
| 5,255,305 A | | 10/1993 | Sattar | 379/34 |
| 5,327,554 A | | 7/1994 | Palazzi, III et al. | 395/600 |
| 5,351,276 A | | 9/1994 | Doll, Jr. et al. | 379/67 |
| 5,353,336 A | | 10/1994 | Hou et al. | 379/67 |
| 5,365,574 A | | 11/1994 | Hunt et al. | 379/88 |
| 5,379,421 A | | 1/1995 | Palazzi, III et al. | 395/600 |
| 5,390,237 A | | 2/1995 | Hoffman, Jr. et al. | 379/67 |
| 5,396,546 A | | 3/1995 | Remillard | 379/96 |
| 5,398,280 A | | 3/1995 | MacConnell | 379/93 |
| 5,457,739 A | | 10/1995 | Le Cheviller | 379/93 |
| 5,461,667 A | | 10/1995 | Remillard | 379/96 |
| 5,517,558 A | | 5/1996 | Schalk | 379/88 |
| 5,530,852 A | | 6/1996 | Meske, Jr. et al. | 395/600 |
| 5,537,586 A | | 7/1996 | Amram et al. | 395/600 |
| 5,608,786 A | | 3/1997 | Gordon | 379/100 |
| 5,654,886 A | | 8/1997 | Zereski, Jr. et al. | 364/420 |
| 5,661,787 A | | 8/1997 | Pocock | 379/101.01 |
| 5,719,921 A | | 2/1998 | Vysotsky et al. | 379/88 |
| 5,761,662 A | | 6/1998 | Dasan | 707/10 |
| 5,768,528 A | | 6/1998 | Stumm | 395/200.61 |
| 5,774,671 A | | 6/1998 | Satoh | 395/200.61 |
| 5,799,063 A | | 8/1998 | Krane | 379/67 |
| 5,822,405 A | | 10/1998 | Astarabadi | 379/88 |
| 5,825,854 A | | 10/1998 | Larson et al. | 379/67 |
| 5,864,607 A | | 1/1999 | Rosen et al. | 379/90.01 |
| 5,884,262 A | | 3/1999 | Wise et al. | 704/270 |
| 5,912,952 A | | 6/1999 | Brendzel | 379/93.25 |
| 5,915,001 A | | 6/1999 | Uppaluru | 379/88.22 |
| 6,353,660 B1 | * | 3/2002 | Burger et al. | 379/88.17 |
| 6,377,664 B2 | * | 4/2002 | Gerszberg et al. | 379/88.13 |
| 6,400,806 B1 | * | 6/2002 | Uppaluru | 379/88.17 |

* cited by examiner

700

1000

SYSTEM AND METHOD FOR GATHERING, PERSONALIZED RENDERING, AND SECURE TELEPHONIC TRANSMISSION OF AUDIO DATA

BACKGROUND OF THE INVENTION

1. Field of the Invention

The present invention relates to computer systems that selectively gather, format, and present data to information seeking customers. More particularly, the invention concerns a computer-driven system that continually collects electronic data into local stores via Internet or other conveyance, and responsive to customer inquiries, selectively retrieves data from the local stores in areas of interest to the inquiring customers, and renders the data in audio form to the customers via their telephones.

2. Description of the Related Art

Today's information age provides a limitless source of information, much of it is available through the public Internet ("Internet"). The Internet includes a vast number of computers and computer networks world wide, where the computers are interconnected through various electronic communication links. The key to accessing this wealth of electronic information is having a computer of sufficient computing power and other capabilities. With a keyboard and mouse close at hand, a computer user's power to seek and retrieve information can be astonishing. Helpful and entertaining information abounds from government agencies, television stations, catalog stores, educational institutions, individuals, and many other sources.

Sometimes, it seems, there is too much information. Tools have therefore arisen for users to gather information from the Internet with added efficiency and deliberation. As an example, Internet users may actively invoke various software programs called "search engines" to construct and execute searches for particular items of data. To the user's benefit, more passive means of information gathering are also available. Certain web vendors offer downloadable graphics "toolbars" that automatically update themselves to list the latest news headlines, stock prices, sports scores, and other items of information. To some extent, the user can personalize the display of such information. By "clicking" on an appropriate feature on the toolbar, the user activates a hyperlink to a source of the desired item of information on the world wide web.

In a different context, passive information is also presented upon "personal home pages" that various web portals or independent service providers (ISPs) provide to their registered users. A user accesses his/her personal home page by directing his/her web browser to the web vendor's Internet address, and then performing a log-in sequence. After completing the log-in sequence, the web vendor causes the user's computer to display a page containing information and information hyperlinks specific to the user's own personal preferences, which the user previously specified. Such information often includes news stories, weather, stock prices, sports scores, horoscope readings, and the like. In some cases, the displayed hyperlinks lead to information previously gathered and stored by the web vendor, whereas in other cases they lead to data at Internet addresses of other web vendors containing the relevant information.

Whether data is obtained passively or actively, a computer is still the indispensable passport to accessing this wealth of electronic information. Consequently, separation from a computer means the end of access to this incredible depth of information. This creates a serious problem for those that share a computer with others, for people that travel, for those with an unreliable internet connection, for those without time to conduct an Internet session, etc. Without a computer, information is still available from longstanding sources such as television, radio, newspaper, libraries, etc. With these conventional sources, however, there are two primary problems. In one case, the user has little control over the content of data. With television and radio, for example, the user can only change channels or wait for the next program. The second problem with conventional sources of information is the time required to retrieve useful information. A great deal of time is required, for example, to search through books and magazines, and such manual searches do not offer the search power, access speed, and pre-formatting of search engines and personalized home pages.

Consequently, the state of the art is inadequate for those people that have become accustomed to the quickness, variety, and depth of information furnished by computers, but unavoidably find themselves without computer access.

SUMMARY OF THE INVENTION

Broadly, the present invention concerns a computer-driven system that continually collects electronic data via Internet or other conveyance into local stores, and responsive to customer inquiries, selectively retrieves data from the local stores in areas of interest to the inquiring customers, formats the data, and transmits the data in audio form to the customers via their cellular or landline telephones.

One aspect of the invention is a method that performs customized reporting of data to customers via their telephones. Initially, an "information delivery agency" makes advance arrangements with a predefined group of remotely located content providers to repeatedly obtain information of prescribed character. Repeatedly, information delivery agency computers gather digitally stored audio and text information from the predefined content providers and assemble the gathered information into a universal database. Separately, the agency enrolls individual customers, and also obtains each customer's preferences specifying the type and order of information to be delivered.

Then, responsive to a telephone call from an enrolled customer, the information delivery agency's computers engage in a playback session. During the playback session, agency computers retrieve the customer's pre-stored preferences and proceed to identify information already in the universal database that pertains to the customer's pre-stored preferences. Also, after preparing vocalizations of text information where needed, agency computers audibly present the audio information and text vocalizations to the customer in predetermined order via the customer's telephone connection. This is achieved, for example, by using an intermediate telephone network such as a wireless carrier network.

The foregoing features may be implemented in a number of different forms. For example, the invention may be implemented to provide a process that involves collecting electronic data via the Internet or other conveyance, and responsive to customer inquiries, selectively retrieving data from local stores in areas of interest to the inquiring customers, and rendering the data in audio form to the customers via their telephones. In another embodiment, the invention may be implemented to provide an apparatus such as a system for delivering such information. In still another embodiment, the invention may be implemented to provide a signal-bearing medium tangibly embodying a program of machine-readable instructions executable by a digital data processing apparatus to deliver audio information as mentioned above. Another embodiment concerns logic circuitry having multiple interconnected electrically conductive elements configured to perform similar operations.

The invention affords its users with a number of distinct advantages. In contrast to previous arrangements, the invention enables customers to access the Internet regardless of whether they have access to a computer at that moment. Furthermore, since the information is rendered in audio format, customers can receive the services of this invention over widespread geography—nearly anywhere with wireless, landline, or satellite telephone service. In addition, the invention overcomes limitations inherent to television, radio, libraries, and other conventional media by providing information of content and format that is carefully compiled according to the customer's personal interests. Importantly, the transmission of audio data to customers is faster and more secure than previous arrangements because it occurs through direct telephonic connections rather than the Internet. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Audio Information Delivery System: Introduction

Figure 1:
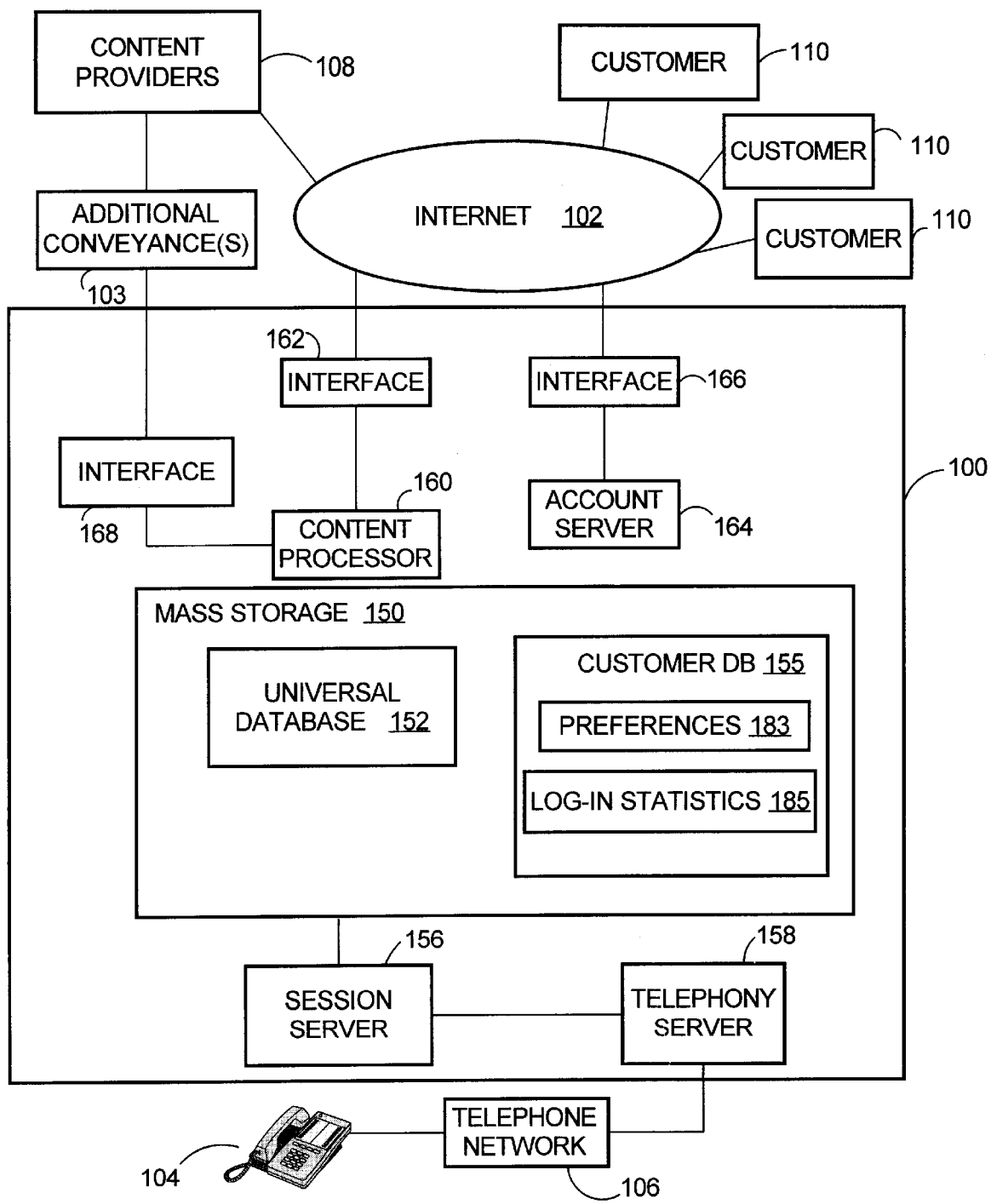
FIG. 1 is a block diagram of the hardware components and interconnections of an audio information delivery system according to the invention.

One aspect of the invention concerns an audio information delivery system, which may be embodied by various hardware components and interconnections. FIG. 1 describes one example in the form of the audio information delivery system 100, which is illustrated in the context of various other peripheral components external to the system 100. Broadly, the system 100 is operated by an information delivery agency and serves to continually collect electronic data from the content providers 108 via the Internet 102 and/or additional conveyances 103. Responsive to customer inquiries, the system 100 selectively retrieves data from local stores in areas of interest to the inquiring customers, formats the data, and transmits the data in audio form to the callers' telephones 104 via telephone networks such as 106. As explained below, the system 100 can rapidly convey information to customers because the underlying data is pre-collected, and because there is a high speed, non-Internet connection between the system 100 and the customer's telephone 104. In this sense, the system 100 exhibits a "minimum latency architecture."

Content Providers

Referring to FIG. 1 in greater detail, the content providers 108 are computer-equipped suppliers of electronic information in various subject areas. In some cases, the content providers 108 may be underlying sources of data, such as magazine or newspaper publishers, content syndicators, or radio producers. Some specific examples include Reuters™ news service, the New York Times™ newspaper, Time™ magazine, ABC News™, etc. In other cases, the content providers 108 may be entities that relay and/or possibly assemble information generated by others, one example being Lexis-Nexis™.

Customers

In addition to the content providers 108, the system 100 also interacts with customers 110. Certain aspects of this interaction occur over the Internet 102, with the customers 110 using personal computers, web-TV units, web-enabled phones, personal information devices, and other electronic internet access devices (referred to collectively as "personal computers"). As shown below, customers 110 communicate with the system 100 from their personal computers in order to establish various customer "preferences" for future "playback" sessions in which they receive audio information from the system 100.

Conveyances

The system 100 gathers information from the content providers 108 and the customers 110 through various conveyances, including the public Internet 102 as well as any additional conveyances 103. The additional conveyances 103 may include news wire, satellite feed, cable, stock ticker, e-mail, dedicated telephone line, dial-up connection, or any other medium suitable for transmission of electronic information as discussed herein. Accordingly, the system 100 includes network cards, modems, intelligent channels, radio transceivers, or other suitable devices to implement interfaces 168, 162, 166, enabling components of the system 100 to interact with the Internet 102 and the conveyances 103. The system 100 may also receive data that is manually entered by staff of the information delivery agency after retrieval from the content providers 108 via automated means or manual conveyances such as postal delivery, courier, overnight mail, fax machine, etc.

Content Processor

Within the system 100, the content processor 160 gathers information from the content providers 108. Such gathering may include actively obtaining information, passively receiving data, a combination of both, etc. As explained below, the content processor 160 continually gathers information in predefined areas, irrespective of the customers' preferences. The content processor 160 stores the gathered data in a universal database 152 contained in mass storage 150. To provide one illustrative example, the content processor 160 may be implemented with one or more personal computers, servers, workstations, mainframe computers, etc.

Mass Storage

Although the mass storage 150 may be configured in a variety of ways according to this invention, one example includes a universal database 152 implemented in a network attached storage device such as a NetApp F700 model Network Appliance brand filer. To minimize the number of concurrent connections and thereby conserve the costs required to operate the database 152, especially large files (such as audio data) may be stored in one particular area of the database 152. For instance, a data file may be identified in one area of the database 152 by storage path and filename, with the actual file contents being stored in a different area of the database 152 structure. For this reason, components such as the session server 156 and telephony server 158 may access the file contents without invoking both areas of the database 152 structure, thereby improving operating efficiency.

As illustrated, the storage 150 also includes a customer database 155. As shown below, the customer database 155 contains information regarding each customer's identity, account data, preferences, etc. Particularly, the customer database 155 contains preferences 183 and a log-in statistics 185. As shown below in greater detail, the preferences 183 include each customer's preferred content and order for audio playback. The log-in statistics 185 include information uniquely identifying each customer, along with personal identification numbers and other appropriate codes. Customer data in the preferences 183 and log-in statistics 185 may be indexed by User-IDs, which are more fully explained below.

Account Server

The account server 164 interacts with customers 110, assisting them in preference choice, account setup, etc. Chiefly, the account server 164 interacts with customers' personal computers via the Internet 102, guiding customers through the process of establishing and later reconfiguring their customer accounts. In this respect, one particularly useful implementation of the account server 164 is a world-wide web server, which presents an interactive "web" page. The account server 164 may also receive account setup/reconfiguration data from other sources, such as web-enabled phones, computers with direct dial-ups, or human agents of the information delivery agency that take the customer's data over the telephone, facsimile, e-mail, postal service, etc. To provide one illustrative example, the account server 164 may be implemented with one or more personal computers, servers, workstations, mainframe computers, etc.

The account server 164 maintains customer data in the customer database 155, which is shown as part of the storage 150 to illustrate one example of efficient storage use. Alternatively, the account server 164 may utilize a different source of storage, such as its own hard disk drive, a separate external storage device, remote storage, etc.

Session Server and Other Components

In contrast to the information gathering and account setup services of the content processor 160 and account server 164, the session server 156 responds to incoming calls from enrolled customers and provides them with selected information from the mass storage 150 according to the individual customers' preferences previously defined through the account server 164. This process is described in greater detail below. To provide one illustrative example, the session server 156 may be implemented with one or more personal computers, servers, computer workstations, mainframe computers, etc.

The session server 156 interacts with a telephony server 158, which comprises a telephone interface component that connects the other components of the system to the Public Switched Telephone Network (PSTN). Accordingly, one example of the telephony server 158 is a Dialogic brand line interface card, such as a D240SCT1 voice card installed in an Intel-based personal computer. To accommodate many concurrent incoming calls, the telephony server 158 include switching equipment to receive calls upon many different telephone numbers, to accommodate concurrent calls to the same number, etc.

Telephone networks such as 106 enable customers to access the telephony and session servers 156,158 from their telephones 104. In the case of wireless telephones, one embodiment of the telephone network 106 comprises a suitable cellular network and the infrastructure of the PSTN and long distance network(s) necessary to complete customers' calls to the telephony server 158. For customers calling from land line phones, the telephone network 106 includes the applicable PSTN and long distance network(s) needed to complete the customer's call.

Exemplary Digital Data Processing Apparatus

The computer-based processors and servers of the invention may be implemented with various hardware components and interconnections. For example, each of the components 160, 164, 156, and 158 may be implemented with a separate digital data processing apparatus. Alternatively, some or all of these components may be consolidated by implementation of a single, albeit more powerful, digital data processor.

Figure 2:
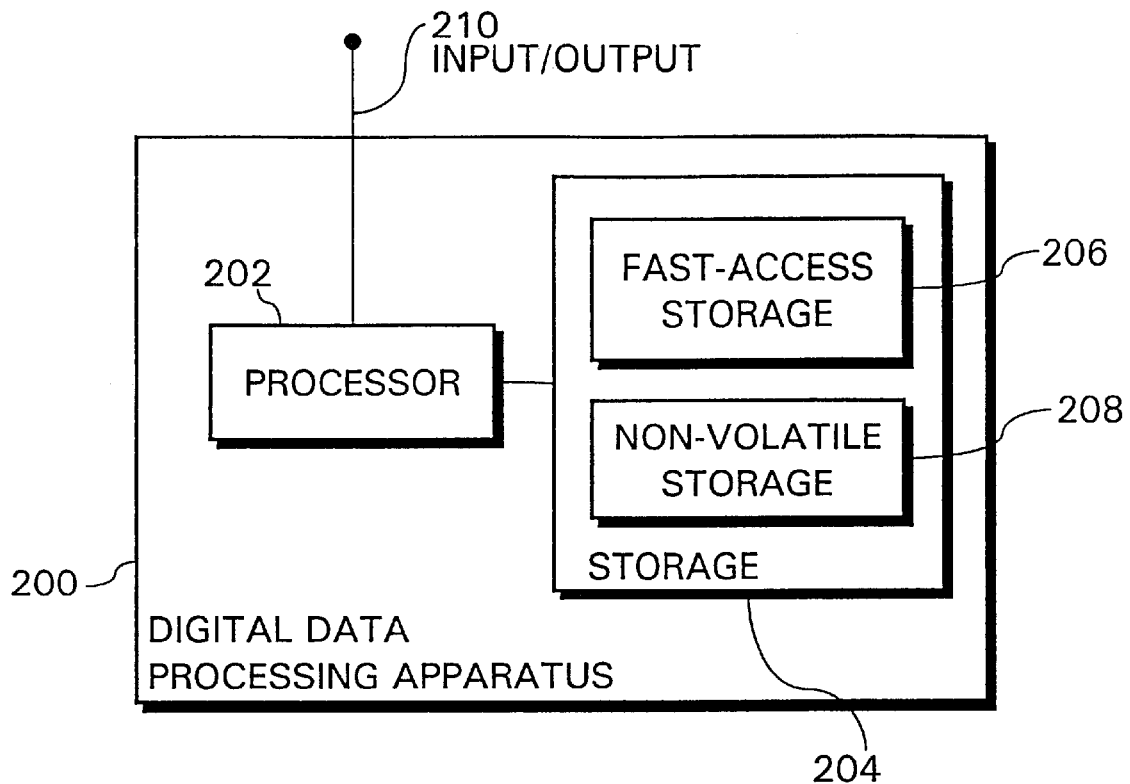
FIG. 2 is a block diagram of a digital data processing machine according to the invention.

In either case; FIG. 2 depicts an exemplary digital data processing apparatus 200. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, some or all of the components 160, 164, 156, 158 may use logic circuitry instead of computer-executed instructions. Depending upon the particular requirements of the application in the areas of speed, expense, tooling costs, and the like, this logic may be implemented by constructing application-specific integrated circuits ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

Having described the structural features of the present invention, the method aspect of the present invention will now be described. Although the present invention has broad applicability to the delivery of audio information services, the ensuing description is particularly suited to the specifics of the structure that has been described above, and the explanation that follows will emphasize such an application of the invention without any intended limitation. The method aspect of this invention collects electronic data via Internet or other conveyance, and responsive to customer inquiries, selectively retrieves data from local stores in areas of interest to the inquiring customers, and renders the data in audio form to customers via their telephones.

Signal-Bearing Media

In the context of FIG. 1, such a method may be implemented, for example, by operating the system 100, as embodied by one or more digital data processing apparatuses 200, to execute respective sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to deliver audio information to telephone callers.

Figure 3:
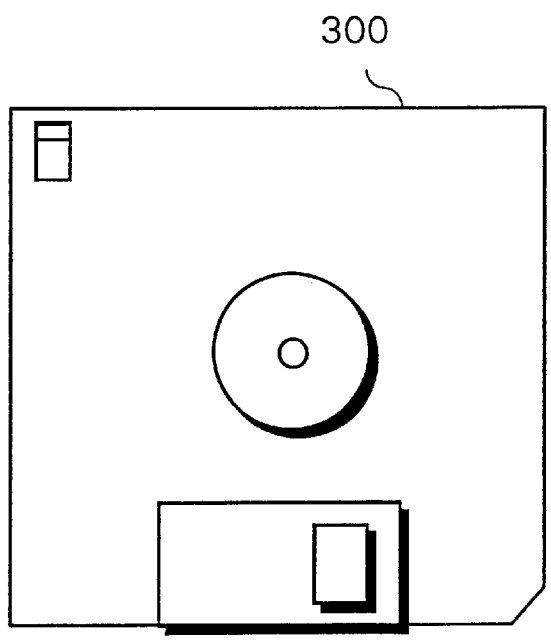
FIG. 3 shows an exemplary signal-bearing medium according to the invention.

As one option, this signal-bearing media may comprise, for example, RAM (not shown) contained within appropriate sites of the system 100. Alternatively, the instructions may be contained in another signal-bearing media, such a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive", redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, certain aspects of the invention may be implemented using logic circuitry, instead of using a processor to execute instructions. In this embodiment, the logic circuitry is used to implement one or more of the components 160, 164, 156, 158 according to the method of the invention. The logic circuitry may be implemented using many different types of circuitry, as discussed above.

Obtaining Information from Content Providers

Figure 4:
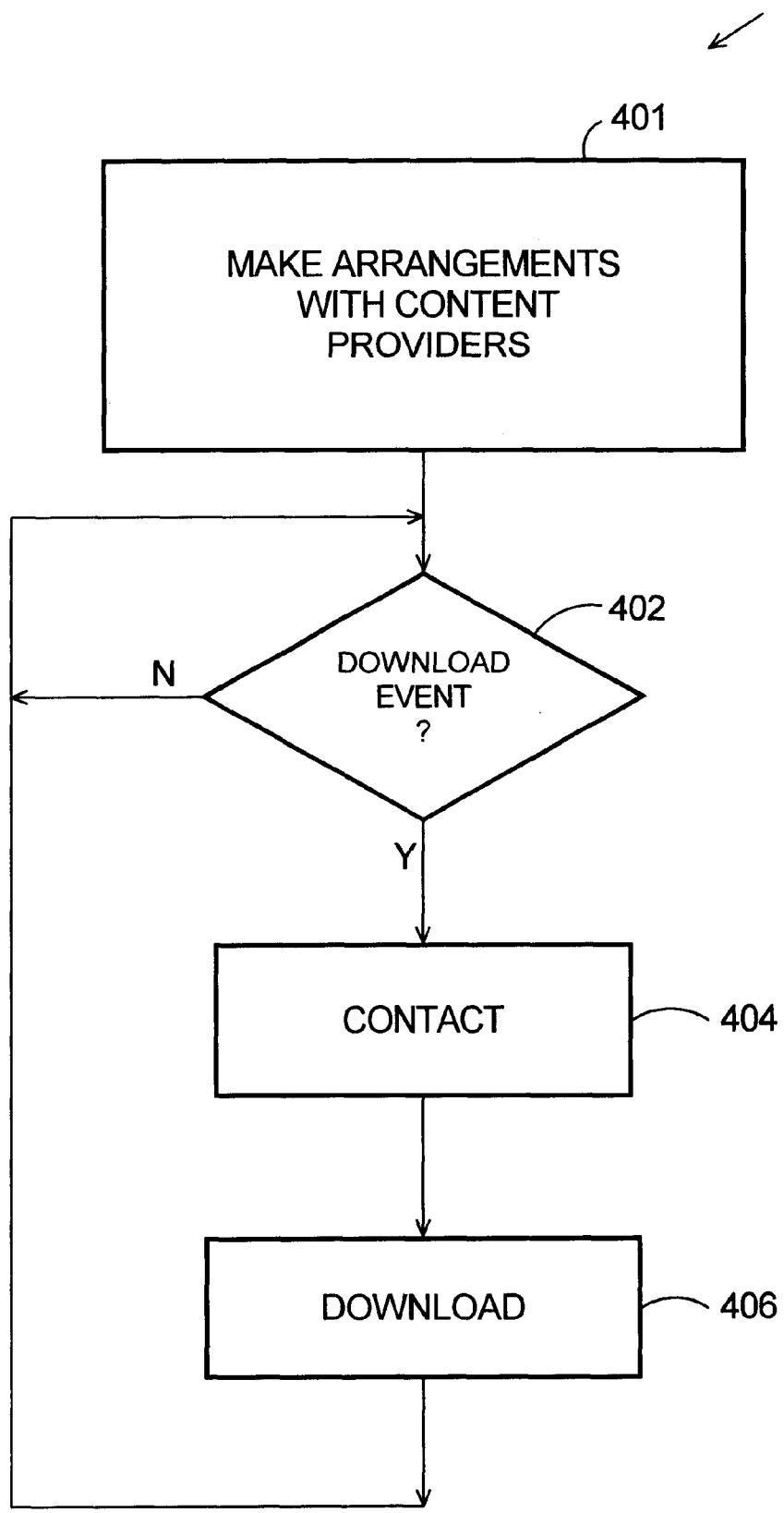
FIG. 4 is a flowchart of an operational sequence for obtaining information from content providers, according to the invention.

To begin illustrating the method aspect of this invention, FIG. 4 shows a sequence 400 that illustrates operations performed by the system 100 to obtain information from the content providers 108. In subsequent playback sessions (described below), this downloaded information is reformatted and presented to customers in audio form over their telephones.

For ease of explanation, but without any intended limitation, the example of FIG. 4 is described in the context of the hardware environment of FIG. 1, as described above. In step 401, the information delivery agency that manages the system 100 makes financial or other suitable arrangements for obtaining information from content providers 108. This may involve subscribing to on-line, wire, satellite, or other information services, for example. According to the present invention, the information delivery agency selects content providers with data that is particularly suitable for audio playback to telephone callers. Thus, the arrangements of step 401 may even involve agreements requiring certain content providers to supply underlying data that is suitable for replaying to telephone callers, such as (1) digital audio files in WAV, VOX, AUD, MP3, RA, PCM, or other format or protocol, (2) text stories in suitable brevity, content, detail, and other format for rendering in audio form to cellular or other customers, or (3) other types of data.

The arrangements of step 401 may also specify the type of information to be downloaded from each content provider. As explained in greater detail below, the content processor 160 seeks to repeatedly download information in several predefined areas of subject matter, called "topics." Data under some topics may be downloaded from certain content providers, with data of other topics being downloaded from different content providers.

Arrangements having been made, step 402 waits for a "download event" to occur. Occurrence of a download event at the content processor 160 or at a content provider 108 triggers downloading information from a content provider 108 to the content processor 160. Download events may occur periodically, randomly, on a non-periodic schedule, or another basis.

At the content processor 160, for example, a download event may constitute a self-scheduled reminder to start downloading information from one or more content providers particular to that reminder. These reminders may be scheduled periodically (such as every hour, day, etc.), randomly, non-periodically (e.g., whenever a news alert is received), or according to another desired schedule. Downloading may occur more frequently for time critical data (such as stock market updates, traffic reports, etc.) and less often for static or preset data (such as television programming, etc.). Moreover, download events may occur on different schedules for different "topics" (as discussed below), such as continual updates for traffic reports, daily updates for sports scores, and monthly updates for television programming.

Download events may be initiated by the content providers 108 as well, such as when a content provider self-initiates data transfer to the content processor 160 according to its own schedule. Such a schedule may, for example, be periodic, random, non-periodic, or another schedule which might or might not be prearranged with the information delivery agency. As an example, a content provider 108 may experience a download event whenever it accumulates more than a certain amount of information, or whenever a news story breaks.

In step 404, contact is initiated between the content processor 160 and the content provider(s) 108 related to the download event. In the case of a download event at the content processor 160, contact in step 404 is initiated by the content processor 160. For instance, the content processor 160 may initiate contact (step 404) with the content provider 108 in order to request that content provider 108 to start downloading data, engage in handshaking or other tasks related to establishing communications, etc. In the case of a download event at the content provider 108, contact in step 404 is initiated by that content provider 108.

In step 406, the information download occurs. In this operation, the content provider 108 transmits (and the content processor 160 receives) data. In the illustrated example, downloading is performed independent of any individual customer's preferences, and therefore constitutes a "universal" download. If desired, downloading may be driven according to customer preferences in an alternative implementation.

The content of downloaded data is further explained as follows. Namely, the different preset areas of subject matter to be downloaded are referred to as "topics," and the pre-arranged information in these topics is downloaded repeatedly independent of individual customers' preferences (i.e., "universally"). Each download (step 406) may involve one or multiple topics, depending upon the nature of the download event. With repeated performance of step 406 (FIG. 4), the content processor 160 maintains a desired level of currency of data in the subject matter of each topic. In the present example, the content processor 160 downloads information area in the following topics:

Topic 1—Traffic
Topic 2—News
Topic 3—Financial Ticker
Topic 4—Entertainment
Topic 5—Sports
Topic 6—Weather
Topic 7—Horoscope After each performance of step 406, control returns to step 402 to await the next download event.

Account Setup/Change

Figure 5:
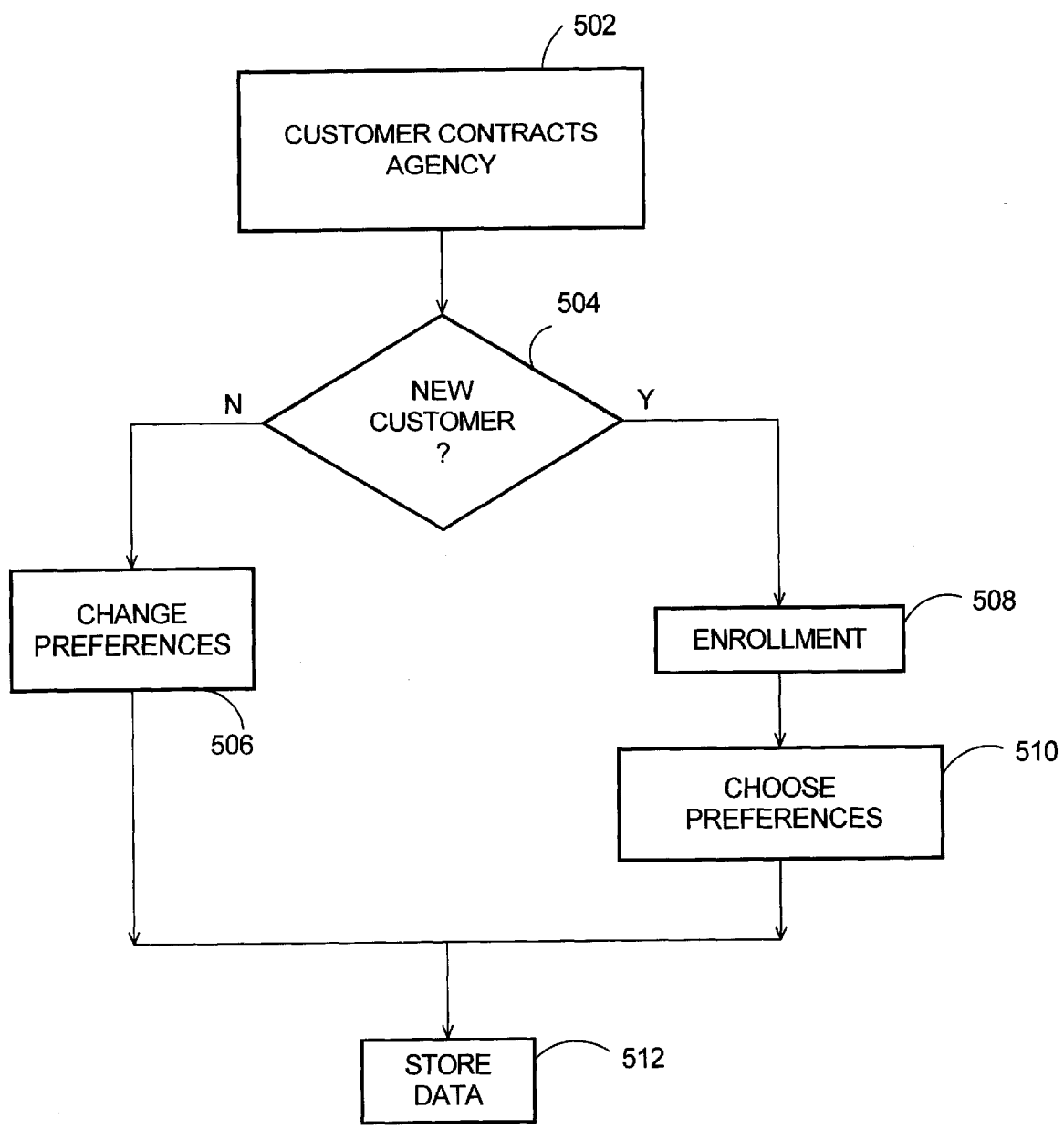
FIG. 5 is a flowchart of an operational sequence for establishing and reconfiguring a customer account according to the invention.

FIG. 5 shows a sequence 500 that illustrates the operations of enrolling and/or reconfiguring a customer account. Completion of customer enrollment is necessary for the customer to subsequently receive customized audio information from the system 100, as shown below.

For ease of explanation, but without any intended limitation, the example of FIG. 5 is described in the context of the hardware environment of FIG. 1, as described above. In step 502, a customer contacts the information delivery agency ("agency"). This customer is referred to as the "current" customer. As illustrated in FIG. 1, contact may be achieved by the customer's use of a personal computer to contact the account server 164. More particularly, the customer's computer utilizes the Internet 102 to interact with the web page presented by the account server 164. Alternatively, the customer 110 may access a telephone or other automated system, or even communicate with human operators of the agency by telephone voice connection, postal service, facsimile, or another appropriate mode of communication. For ease of explanation, the remaining operations are discussed in the context of a completely automated embodiment, wherein the customer utilizes a personal computer to interact with the account server's web page.

In step 504, the account server 164 consults the customer database 155 to determine whether the current customer is new to the system 100. This may be achieved, for example, by facilitating a log-in process for existing customers and a "set up new account" option for new customers. If the customer is new, the account server 164 proceeds to setup a new account for the current customer in step 508. Step 508 is referred to as "enrollment." After enrollment, the account server 164 prompts, permits, or otherwise enables the customer to construct a list of preferences 183 regarding future delivery of audio information to the customer (step 510). In addition to the content preferences, which specify the type of information for playback, the account server 164 may solicit various playback preferences such playback order, playback language, playback voice type, playback speed, playback volume, etc. Although step 510 (and step 506, discussed below) may be implemented in various ways, the account server 164 may advantageously use a graphics user interface ("GUI") including features such as check-boxes, radio buttons, pull-down menus, and the like.

In contrast to the foregoing description, if step 504 finds that the current customer is not new, step 504 leads to step 506. In step 506, the account server 164 permits the customer to change his/her existing preferences 183, as discussed in greater detail below. Following step 506 (or step 510), step 512 stores the customer's new preferences in the customer database 155, completing the sequence 500.

Customer Preferences

As mentioned above, the routine 500 assists customers in initially establishing and later reconfiguring respective "preferences" that govern future delivery of audio information. Unlike the universally pre-downloaded "topics" which pertain to predefined areas of subject matter, customers' preferences help the system 100 identify data for presentation to each individual customer during "playback" (as discussed in greater detail in FIG. 7, below). As mentioned above, customer preferences include content preferences and playback preferences. The customers' preferences 183 are stored in the customer database 155, mentioned above.

In the subject matter of each topic, the account server 164 is programmed to recognize certain "segments" and various deeper layers of "sub-segments" that are available for inclusion in customers' content preferences. When the account server 164 assists the customer in establishing (step 510) or changing (step 506) the customer's preferences, use of the segments and sub-segments permits customers to carefully tailor their content preferences to their own interests.

An exemplary list of segments under the topic "traffic" may include, for example, all major U.S. cities. Under the segment of a given city, suitable sub-segments may comprise areas of the city, freeways, traffic centers, highway intersections, etc. As another example, the "sports" topic may include segments such as "teams" (with different sports teams providing the sub-segments) and "league summaries" (with different sports providing the sub-segments). In step 510, the customer chooses the topics, segments, and sub-segments of interest to him/her.

To further illustrate the relationship of topics and segments, TABLE 1 (below) shows an exemplary listing of a customer's content preferences.

TABLE 1

EXEMPLARY CUSTOMER PREFERENCE LISTING

Topic 1 - TRAFFIC

| | |
|---|---|
| (Segment) | (Sub-Segment) North County |
| San Diego, | (Sub-Segment) South County |
| CA | (Sub-Segment:) East County |
| (Segment) | (Sub-Segment) I.H. 10 |
| Houston, TX | (Sub-Segment) I.H. 35 |
| | . . . |
| . . . | . . . |

TABLE 1-continued

EXEMPLARY CUSTOMER PREFERENCE LISTING

Topic 2 - HEADLINE NEWS

Wall Street Journal Hourly Report
Headline News
. . .

Topic 3 - FINANCIAL TICKER

^DJI, ^IXIC, ^SPC, MOT

Topic 4 - ENTERTAINMENT

| Movie Listings | San Diego | La Jolla 3 |
| | | AMC Mission Valley 12 |
| | | Kensington |
| | Santee | Santee Drive-In |
| | Carlsbad | Carlsbad 12 |
| | . . . | . . . |
| Television Listings | San Diego Stations | Channel 1 |
| | | Channel 2 |
| | | Channel 3 |
| . . . | . . . | . . . |

Topic 5 - SPORTS

| Teams | San Diego Chargers |
| | Chicago Bears |
| | Minnesota Twins |
| League Summaries | Football |
| | Hockey |
| | W.W.F. |
| . . . | |

Topic 6 - WEATHER

. . .
San Diego
San Francisco
San Jose
. . .

Topic 7 - HOROSCOPE

Aries
Taurus
Gemini
Cancer
Leo
Virgo
Libra
. . .

Enrollment

Figure 6:
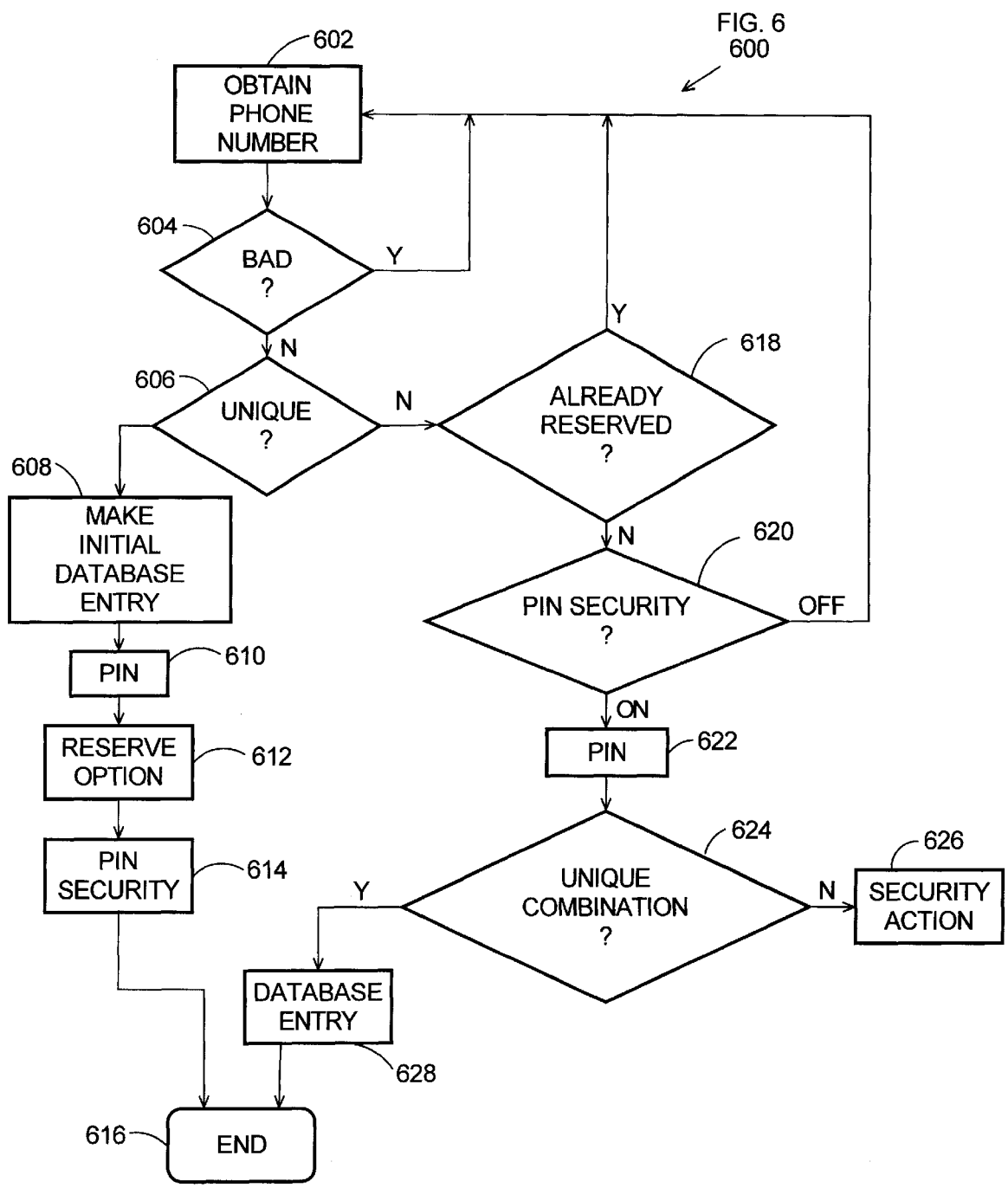
FIG. 6 is a flowchart showing the enrollment routine of the account setup sequence in greater detail, according to the invention.

FIG. 6 shows an operating sequence 600 to describe the enrollment step 508 (FIG. 5) in greater detail. Without any intended limitation, FIG. 6 is described in the context of the hardware components and interconnections of FIG. 1. The operations 600, which expand step 508, are performed by the account server 164 as it interacts with a customer 110. For ease of illustration, the following example depicts the embodiment where the account server 164 and customer 110 conduct enrollment by communicating over the public Internet 102. In the illustrated embodiment, where the customer 110 is utilizing a computer, interaction between the account server 164 and customer 110 occurs by means of a graphical user interface (GUI) operated by the account server 164.

As the operations 600 involve reading, completing, and updating the log-in statistics 185, an exemplary excerpt of log-in profiles is shown below in TABLE 2. Referring to TABLE 2, the log-in profiles list the following information for each customer:

1. the customer's name.
2. the customer's "designated" phone number (entered by the customer during enrollment, as discussed below).
3. the customer's unique "User-ID".
4. the customer's personal identification number (PIN).
5. whether the customer's designated telephone number is reserved.
6. whether the customer has activated PIN security.
7. whether the designated telephone number is known to be invalid.

TABLE 2

EXEMPLARY LOG-IN PROFILES

| CUSTOMER NAME | DESIGNATED TELEPHONE NUMBER | USER-ID | PIN | PHONE NUMBER RESERVED? | PIN SEC. | INVALID PHONE NUMBER |
|---|---|---|---|---|---|---|
| Husband | 310-555-1212 | 123456 | 1234 | NO | ON | NO |
| Wife | 310-555-1212 | 923457 | 3908 | NO | ON | NO |
| Abbey | 310-555-9999 | 330989 | 1234 | YES | OFF | NO |
| Charley | 310-555-2222 | 220908 | 0090 | NO | OFF | NO |
| Phil | 310-555-7777 | 787790 | 7777 | YES | ON | NO |
| Hacker | 111-222-3333 | — | — | — | — | YES |

The details of TABLE 2 are discussed below, where needed to supplement the operations of FIG. 6.

Referring to FIG. 6, the routine 600 begins in step 602 where the account server 164 prompts the customer to enter a "designated telephone number." As shown below, the customer may enjoy certain advantages in convenience by choosing, as his/her designated telephone number, the number of the telephone that the customer will typically use to receive audio playbacks according to this invention; the account server 164 may so advise the customer in step 602. In step 604, the account server 164 determines whether the designated telephone number is valid, by cross-referencing the number from step 602 with the "invalid phone number" column. For instance, the designated telephone number is invalid if it cites a non-existent area code, corresponds to a stolen telephone, does not contain sufficient digits, etc. Furthermore, human administrators and/or the account server 164 may act in response to hacking attempts, known pranks, and the like by updating the log-in statistics 185 to show an "invalid phone number" entry in association with the intruder's originating telephone number (detected through caller-ID, automated number identification, or other means) and/or the intruder's designated telephone number. As an example, TABLE 2 shows an "invalid" telephone number for "Hacker."

Unless the customer designates a valid telephone number, step 604 returns to step 602. For reasons of security and efficiency, step 604 may (optionally) abort the enrollment process 600 if the enrolling party repeatedly enters invalid telephone numbers. When the customer designates a valid telephone number, step 604 advances to step 606, which reviews the log-in statistics 185 to determine whether any other customer is already using this designated telephone number. If not, this means the designated telephone number is "unique" among the present customers. In TABLE 2, for example, the designated telephone number for Abbey is unique. In this case, step 606 advances to step 608, where the account server 164 makes an initial database entry. Namely, the server 164 generates a User-ID, which is calculated so as to be unique among all customers. New User-IDs may be generated, for example, by adding "one" to the previously assigned User-ID, or another appropriate step. Also in step 608, the server 164 updates the log-in statistics 185 by entering the customer's name (which may be prompted in step 608 or 602 or another step), designated telephone number, and User-ID. Also, the server 164 writes "yes" under the "phone number reserved" column, to temporarily "lock" the designated telephone number during the enrollment process. The use of the "phone number reserved" value is discussed in greater detail below.

After step 608, the server 164 prompts the user for a PIN (step 610), and stores the PIN in the log-in statistics 185. In step 612, the server 164 interacts with the customer to determine whether the customer wishes to "reserve" his/her designated telephone number, and thereby prevent future new customers from using that designated telephone number (as discussed below). If the current customer chooses to reserve his/her designated telephone number, the server 164 leaves the "YES" entry that was placed under "phone number reserved" in step 608 to lock the number during enrollment. Otherwise, the "phone number reserved" column is changed to "NO" for the current customer. In TABLE 2, for example, customer Abbey has chosen to reserve her designated telephone number.

If the customer does not wish to reserve his/her designated telephone number, as with customers Husband or Wife, the server 164 enters "NO" for "phone number reserved" in step 612. After step 612, the server 164 prompts the customer regarding the system's use (or non-use) of PIN security when the customer logs-in to receive future audio playbacks (step 614). Namely, the server 164 advises the customer that s/he may automatically conduct future log-ins by calling the telephony server 158 (no PIN required). If the customer chooses this option, the server 164 writes "OFF" under the "PIN security" column, as with customers Abbey and Charlie. As step 614 completes the customer's enrollment process, the routine 600 ends in step 616.

Referring back to step 606, if the log-in statistics 185 show that customer's designated telephone number (from step 602) is not unique among all customers in TABLE 2, certain additional steps are performed starting in step 618. An example of this circumstance would be the later one of Husband or Wife to register, since they have the same home telephone number. In general, the server 164 permits multiple customers to use the same designated telephone number to accommodate different users that share the same home or office telephone, for instance. However, as shown above in step 612, the system 164 provides the first customer to utilize a particular designated telephone number with an option to "reserve" that number and thereby prevent future users from using the same designated telephone number. Accordingly, step 618 determines whether the current customer's designated telephone number, found to be non-unique in step 606, is previously reserved. This is performed by consulting the log-in profile 185 to determine whether the "phone number reserved" column contains "YES" or "NO." Although the log-in statistics 185 will show that the number is reserved if the number's initial registrant chose to reserve the number (step 612), the number will also be shown as "reserved" (per step 608) if a previous registrant is currently enrolling under that designated telephone number. If step 618 answers "YES" for either reason, then the number is reserved, and step 618 returns to step 602 to prompt the customer for a different designated telephone number.

On the other hand, if the number is not reserved, then multiple customers can share the number as long as the earlier customer has chosen to have the "PIN security" option placed "ON" (because automated, no-PIN log-ins would not be able to distinguish between two different customers sharing the same designated telephone number). Accordingly, step 620 determines whether the earlier customer's PIN security option is ON or OFF. If PIN security is "OFF," telephone number sharing would breach security for the telephone number's initial registrant, so step 620 returns to step 602, requiring the current customer to submit a different designated telephone number.

If the PIN security option is "ON", this means the designated telephone number's initial registrant requires a PIN to access under that customer's identity. In this case, step 620 advances to step 622, which prompts the enrolling customer to enter a PIN. Step 624 determines whether the current customer's PIN (from step 622) is different than that of the designated telephone number's existing registrant. If so, step 628 updates the log-in statistics 185 to store the newly entered PIN, and the routine ends in step 616. Otherwise, if the customer happened to choose the same PIN as the shared telephone number's initial registrant, then step 624 advances to step 626, which takes one or more appropriate security actions to preserve the security of the designated telephone number's initial registrant. As an example, these actions would be invoked, if customer Wife chooses the PIN 1234, matching customer Husband's pre-existing PIN. Step 626, for example may transmit a notification to the initial registrant advising him/her that another customer has guessed his/her PIN while registering under the shared telephone number. As a different option, step 626 may automatically assign the first registrant a new PIN and transmit notification of that PIN to the registrant, in order to preserve the security of the initial registrant's account. Transmission of such notification may occur by telephone, e-mail, audio, notification when the customer calls to receive a playback, etc. Step 626 also returns the presently enrolling customer to step 622, to obtain another PIN selection. As still another alternative, the account server 164 may assign a PIN (different from the initial registrant's PIN) to the current customer in step 622 and skip steps 624, 626.

Playback Session

Figure 7:
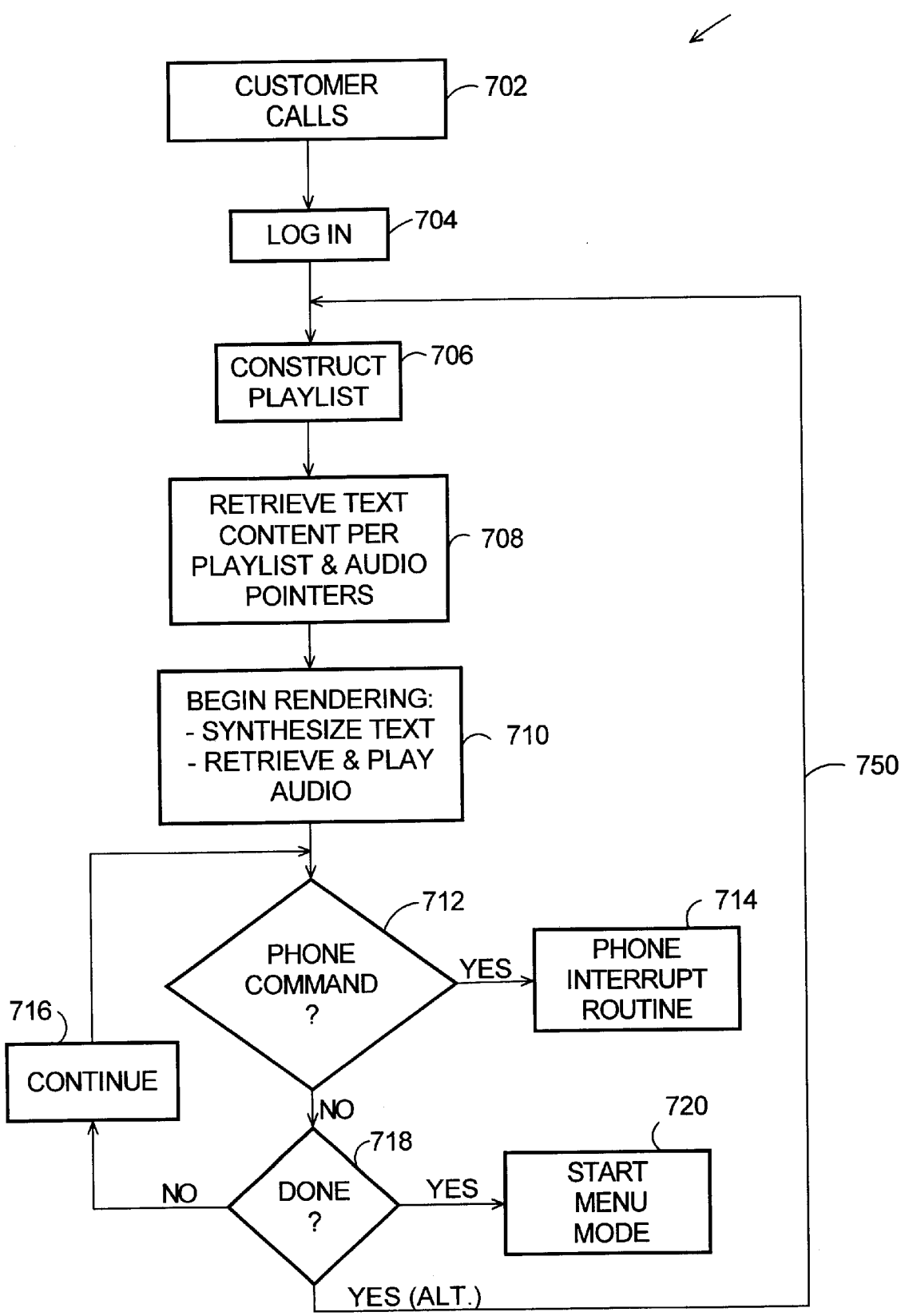
FIG. 7 is a flowchart of an operational sequence for conducting a playback session according to the invention.

FIG. 7 shows an operational sequence 700 of the session server 156 during a customer-initiated "playback session." During the playback session, the system 100 retrieves the customer's pre-stored content preferences and proceeds to identify information already present in the universal database that pertains to those particular content preferences. Also, after preparing vocalizations of text information where needed, agency equipment audibly presents the audio information and vocalizations to the customer in predetermined order via the customer's telephone connection. The order and manner of presentation is dictated by the caller's playback preferences. Playback is achieved by using the intermediate telephone network 106.

More particularly, the playback session is initiated when a customer places a telephone call to the system 100 from a telephone 104 (step 702). Although landline phones may also be used, step 702 may be conveniently initiated by the customer from a wireless telephone while the customer is driving, walking, or otherwise away from a computer. In step 704, the session server 156 conducts a log-in operation, verifying that the caller is an enrolled customer. Broadly, step 704 determines the customer's designated telephone number, and verifies the customer's PIN (if necessary). As shown below, the session server 156 may expedite the log-in process if the number of the customer's telephone 104 appears in the log-in statistics 185, and may further expedite the process if the customer has chosen to set "PIN security" as "OFF" as explained above. As part of step 704, the session server 156 consults the log-in statistics 185 to determine the caller's User-ID. The details of step 704 are illustrated in the sequence 800 (FIG. 8), discussed below.

After log-in completes, the session server 156 constructs the caller's playlist in step 706. Specifically, the session server 156 indexes the preferences 183 by the caller's User-ID to obtain the content preferences particular to the caller. Then, with the caller's content preferences, the session server 156 uses these preferences to retrieve information (step 708) from the universal database 152 in satisfaction of these preferences. In the illustrated example, the session server 156 retrieves (1) text content stored in the universal database 152, and (2) pointers to digital audio files stored in the database 152. The actual pointed-to digital audio files are retrieved later, as discussed below. As an example, if the customer has indicated a desire to hear information in the "sports" topic, the session server 156 accesses the database 152 to retrieve the applicable sports-related file names and locations of those files in the file system. As explained below, the session server builds these files into the playlist and then sends a playlist to the telephony server.

After retrieving the data underlying the caller's playlist (step 708), step 710 starts the process of "rendering" the data, in which audio sounds are transmitted to the customer's telephone 104. Rendering involves (1) processing digital audio files that were identified by the pointers retrieved in step 708 in order to transmit the digitally represented sounds to the customer's telephone 104, and (2) synthesizing text data by using a computer voice synthesizer to pronounce the text.

After the rendering process begins in step 710, additional steps are performed during rendering to assist the caller in "navigating" his/her playlist. Namely, step 712 detects whether the caller has entered a "phone command" using the telephone 104. If step 712 detects a phone command, step 714 performs a audio interrupt routine 714, described below. The audio interrupt routine 714 detects the customer's telephone touchpad entries and/or voice commands and reacts in a preplanned manner to let the caller skip from one topic to the next, repeat a topic, and perform other "navigation" functions.

Otherwise, in the absence of a phone command, step 718 determines whether the rendering step 710 has completed the playlist. If not, rendering continues in step 716. Ultimately, when step 718 determines that the rendering process started in step 710 has completed, step 720 begins a "menu mode" as described below. As an alternative to the menu mode (step 720), step 718 may re-start rendering of the playlist by returning to step 710. Another alternative is to return to step 706 as shown by the path 750, thereby ensuring that the playlist is- freshly updated before replaying.

Log-In

Figure 8:
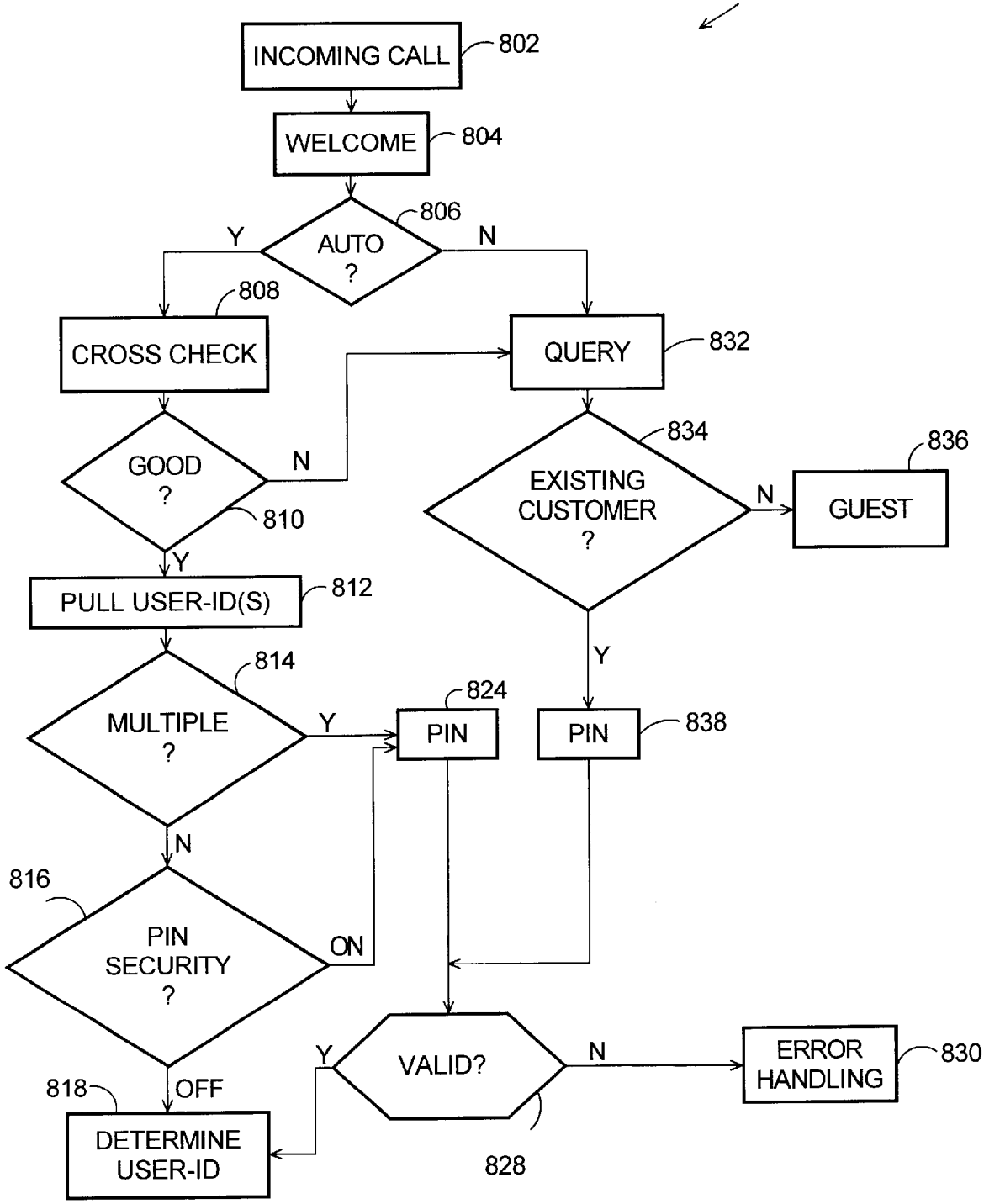
FIG. 8 is a flowchart showing of the log-in sequence of the playback session in greater detail, according to the invention.

FIG. 8 shows the log-in process (from step 704, FIG. 7) in greater detail. As mentioned above, the session server 156 conducts the log-in operation in order to verify that the caller is an enrolled customer, prior to beginning playback. Broadly, this process determines the customer's designated telephone number, and verifies the customer's PIN (if necessary).

Without any intended limitation, FIG. 8 is described in the context of the hardware components and interconnections of FIG. 1. The operations 800, which expand step 704 (FIG. 7), are performed by the session server 156 as it interacts with a caller 104. In step 802, the session server 156 receives notification of an incoming call, this notice arriving from the telephony server 158. In response, the session server 156 plays a predetermined welcome message, such as "Welcome to the Indicast Network!" (step 804).

In step 806, the session server 156 queries the telephony server 158 to determine whether the telephone number of the caller's telephone 104 can be detected, for example by an analog technique such as caller-ID, or by a digital technique such as automatic number identification (ANI). If the number of the caller's telephone 104 can be automatically determined, step 806 advances to step 808, where the session server 156 cross-checks this number with the log-in profiles 185. More specifically, step 808 checks whether the automatically detected number of the telephone 104 matches any of the "designated telephone numbers" in TABLE 2. If so, step 810 advances to step 812, where the session server 156 identifies all User-IDs associated with that designated telephone number in the log-in statistics 185.

If the designated telephone number has multiple associated User-IDs, step 814 proceeds to step 824, where the session server 156 requires the caller to submit a PIN, for example by using voice commands or a telephone keypad. Step 828 then determines whether the submitted PIN is valid, i.e., whether TABLE 2 lists this PIN in association with the designated telephone number that was verified in step 808.

If the PIN is valid, step 828 proceeds to step 818, in which the session server 156 cross-references the PIN in the log-in statistics 185 (TABLE 2) to determine the caller's User-ID. The User-ID enables step 706 (FIG. 7) to determine the caller's preferences and to construct an appropriate playlist, for subsequent use in referencing the user's content preferences and constructing a suitable playlist.

In contrast to the foregoing description, if the caller-submitted PIN is not valid, step 828 leads to error handling actions in step 830. As an example, step 830 may return to step 824, prompting the caller to submit a different PIN. Furthermore, after experiencing repeated PIN-submission errors, step 830 may disconnect from the telephone 104 to prevent password guessing, hacking, etc. After an excessive number of PIN-submission errors originating from the same telephone number, step 830 may enter the telephone number in the log-in statistics 185 (TABLE 2) as an "invalid phone number." As another option, step 830 may provide forgetful callers with a reminder of their PINs by commencing a hint sequence, or by generating an e-mail message containing the PIN and sending the message to the customer associated with the current designated telephone.

In contrast to the foregoing description, if the designated telephone number only has one associated User-ID (step 814), step 816 proceeds to determine PIN security. If the PIN security option has been selected, step 824 is performed as explained above. If the PIN security option is "OFF" for the caller's designated telephone number (step 816), then step 814 proceeds to step 818 without requiring submission of the caller's PIN. This option may be especially handy for cellular telephone users and other people that wish to call the system 100 and immediately begin listening to the playback of their customized playlist without further action on their part.

The foregoing description addressed the situation where the session server 156 was able to automatically identify the caller's telephone number (step 806). In contrast, if the number of the caller's telephone 104 could not be identified, step 806 proceeds to step 832. In step 832, the session server 156 transmits a synthetic or recorded voice instruction, querying the caller to manually enter his/her telephone number with a suitable entry technique such as touchpad key entry, voice utterance, etc. Then, in step 834, the session server 156 determines whether the telephone number entered by the caller appears in the log-in statistics 185 (i.e., TABLE 2). If not, the session server 156 may treat the caller as a guest (step 836), for example, providing limited services to entice potential customers to enroll. As an alternative, a negative answer to step 834 may cause the server 156 to transmit a refusal message to the customer, and ultimately terminate the call if the customer fails to enter one of the designated telephone numbers listed in the log-in statistics 185.

If step 834 recognizes the telephone number entered by the customer in step 832, then the session server 156 requires the caller to submit a PIN, for example by using voice commands or a telephone keypad (step 838). Alternatively, step 834 may advance to step 812 upon recognizing the telephone number entered by the customer. Step 828 then determines whether the submitted PIN is valid, i.e., whether TABLE 2 lists this PIN in association with the designated telephone number that was entered in step 832. Step 828 leads to steps 830 or 818 as shown above.

Audio Interrupt

Figure 9:
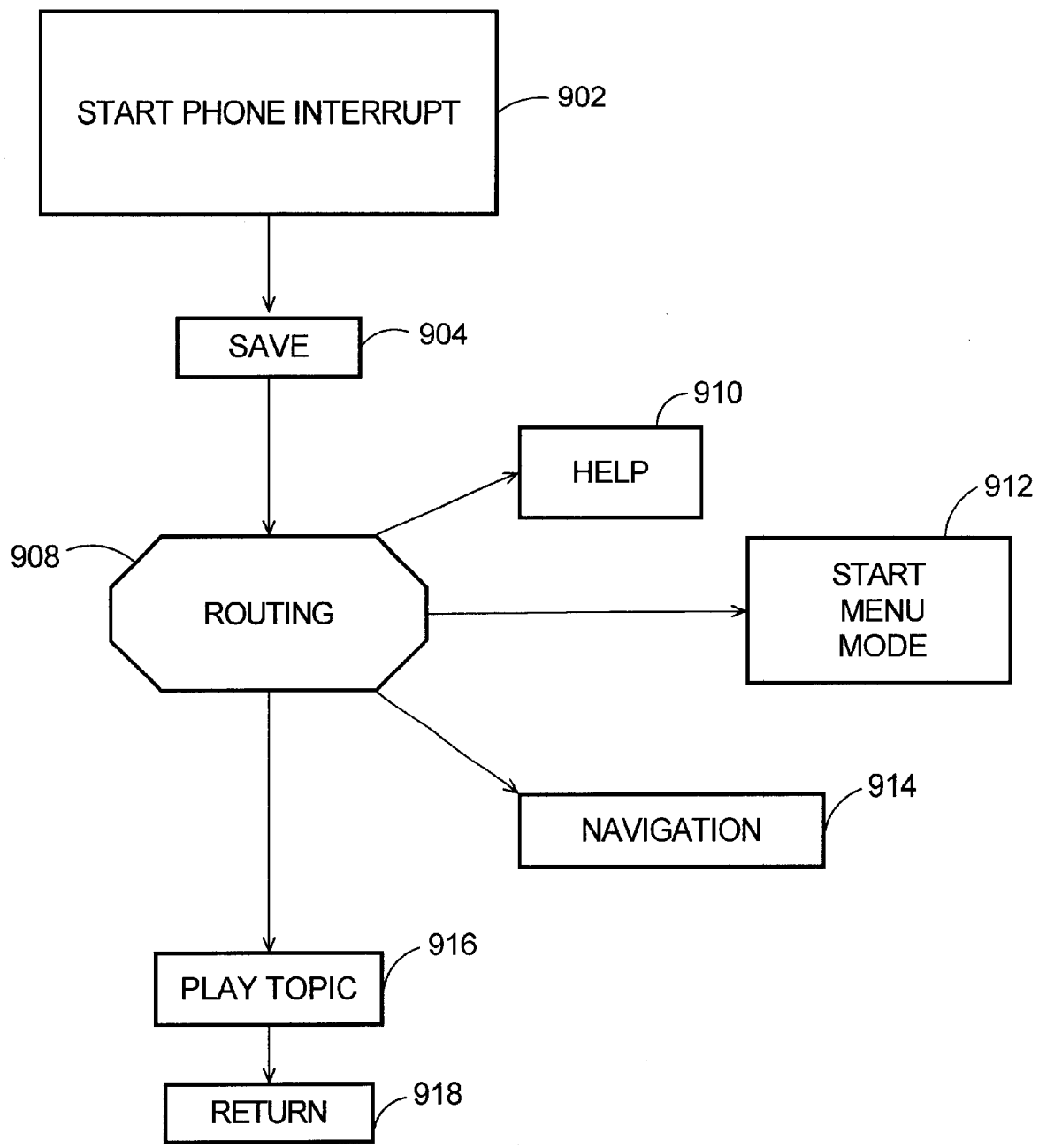
FIG. 9 is a flowchart showing the audio interrupt operational sequence of the playback session in greater detail, according to the invention.

FIG. 9 shows the audio interrupt routine (from step 714, FIG. 7) in greater detail. As mentioned above, the session server 156 performs the audio interrupt routine (step 714) after it detects the caller's entry of a "phone command" during playback (step 712). The audio interrupt routine 714 detects the customer's telephone keypad entries and/or voice commands and reacts in a preplanned manner to let the caller skip from one topic to the next, repeat a topic, and perform other "navigation" functions.

Without any intended limitation, FIG. 9 is described in the context of the hardware components and interconnections of FIG. 1. The operations 900, which describe step 714 in greater detail, are performed by the session server 156 as it interacts with a caller 104 during the playback sequence 700. The audio interrupt routine starts in step 902, triggered by the caller's entry of a telephone keypad entry or voice-uttered command, which causes an affirmative answer to step 712 (from FIG. 7). In step 904, the session server 156 determines how much of the customer's playlist has been played. Namely, step 904 determines the level of completion of rendering (steps 710, 716 from FIG. 7) at the time the customer's audio interrupt occurred. The session server 156 saves a bookmark, pointer, line number, or other representation of the playback progress when the interrupt occurred (step 904).

Then, in step 908 the session server 156 performs a routing step, which initiates an appropriate subroutine depending upon which key or voice command the caller made (in step 712, FIG. 7) to cause the audio interrupt. As an example, different keypad and/or voice entries-may start a help routine (step 910), menu mode (step 912), navigation routine 914, or play topic routine 916.

With the help routine 910, for instance, the session server 156 may provide a body of explanatory material, divided into different topics presented to the caller in the form of an audio menu, activated by voice command and/or telephone keypad entry. Some help topics may include, for example, instructions about navigation commands and pushbutton equivalents, tips on how to speak to the computer (e.g., naturally and directly into the microphone), instructions on how to change preferences, etc.

Figure 10:
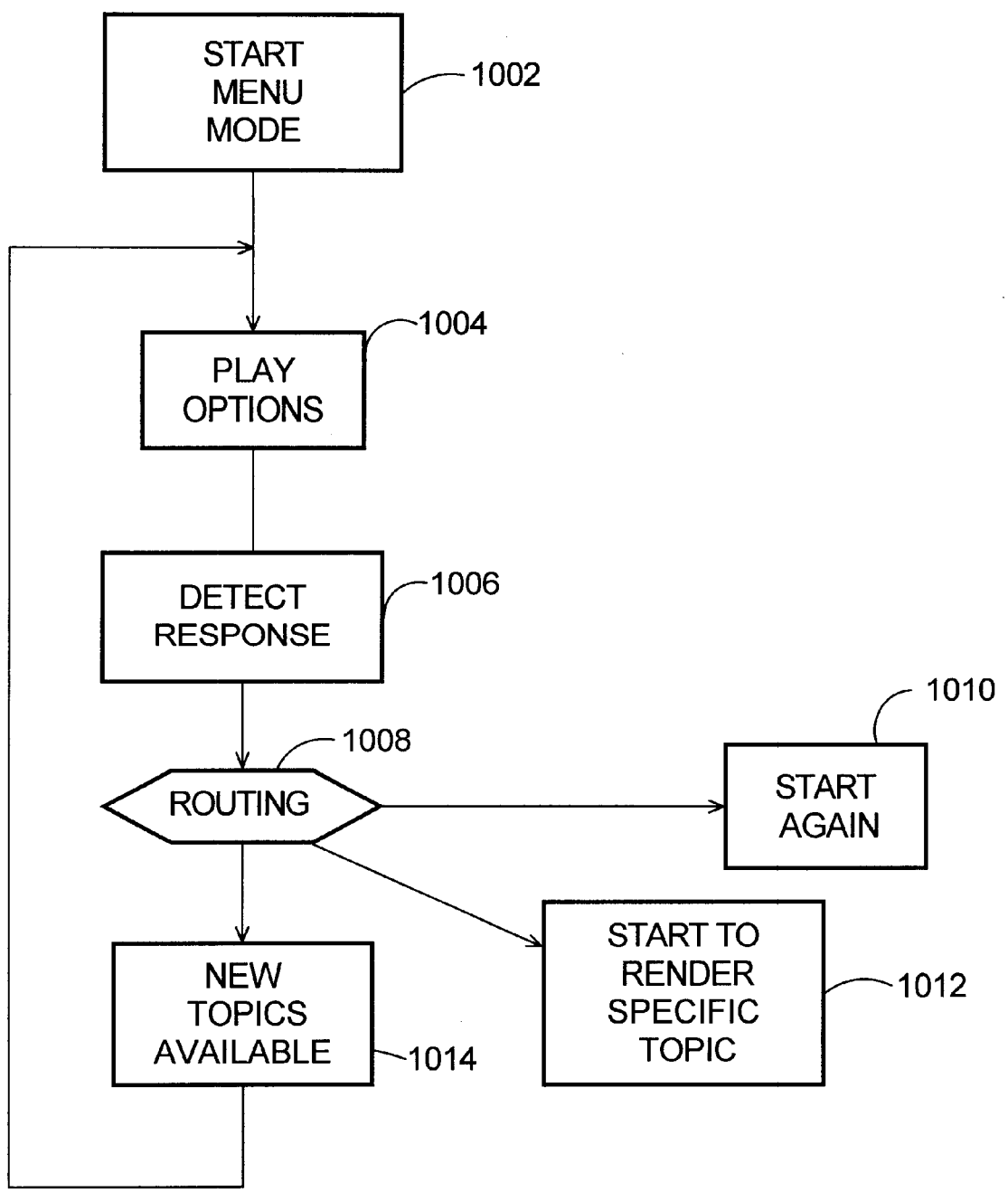
FIG. 10 is a flowchart showing the menu mode of the playback session in greater detail, according to the invention.

The menu mode 912 is discussed in detail below, with reference to the sequence 1000 (FIG. 10). With the navigation routine 914, the session server 156 permits the caller to receive his/her ongoing playback out-of-order. For example, the session server 156 may respond to entry of telephone keypad and/or voice entries as shown below, to permit the caller to navigate his/her playlist as if s/he were listening to songs (i.e., topics, segments, sub-segments . . . ) via audio CD with the caller's telephone as remote control.

1. "#" key (or any key in the rightmost column of the telephone keypad, or a voice uttered "skip") aborts rendering of the current topic, segment, or sub-segment (depending upon the particular implementation) and skips to the next topic.
2. "0" key, with no other key presses in two seconds (or voice "pause") pauses playback, and pressing the "0" key again with no other key presses in two seconds (or voice "resume") resumes paused rendering.
3. "00" ("0" key pressed twice within two seconds, or voice uttered "speech off") toggles speech recognition on/off, thereby enabling/disabling voice commands. Callers may desire to turn speech recognition off, for example, if they are talking to another person while listening to their playback, or there is conversational background noise that is likely to inadvertently start an "audio interrupt."
4. "*" key (or any key in the leftmost column of the telephone keypad, or voice uttered "backup") causes playback to backup by one segment, if possible.

With the play topic step 916, the session server 156 skips ahead to start playback of a particular topic in response to the caller's utterance of that topic name. As an example, the caller may say "traffic", causing the session server 156 to start rendering the traffic topic. After rendering this topic, the session server 156 returns (step 918) to the routine 700 (FIG. 7) at the point at which the original rendering was interrupted (saved in step 904).

Menu Mode

FIG. 10 provides a more detailed explanation of the menu mode mentioned above in step 720 (FIG. 7) and step 912 (FIG. 9). The session server 156 automatically enters the menu mode after it finishes rendering the caller's playlist (step 718, FIG. 7). In addition, the session server 156 enters the menu mode in response to a particular keypad or voice entry by the caller during playback (step 714, leading to step 912). An exemplary voice utterance to start the menu mode may comprise the word "menu." Whether the menu mode is initiated by steps 718 or 908, the same operational sequence 1000 is initiated, this sequence serving to audibly present various playback options to the caller and respond to the caller's entry accordingly.

Without any intended limitation, FIG. 10 is described in the context of the hardware components and interconnections of FIG. 1. The operations 1000, which are initiated by step 720 or step 912, are performed by the session server 156 as it interacts with a customer during the playback sequence 700. After the menu mode starts in step 1002, the session server 156 audibly presents the caller with an audio listing of menu options (step 1004). As an example, the menu options may include (1) restarting the caller's playback (step 1010), (2) starting playback of a particular topic (step 1012), or (3) presenting an audible list of newly available topics.

In step 1006, the session server 156 detects the caller's response to the playback options presented in step 1004, this response being entered by the caller's telephone keypad and/or voice command. The caller's response may be entered during or after step 1004 plays the menu options. After detecting the caller's response (step 1006), the session server 156 routes control to an appropriate subroutine in accordance with the caller's selection (step 1008). For instance, in response to the caller's opting to hear the list of new topics, the session server 156 plays a list of the new topics (step. 1014). After step 1014, the session server 156 may return to step 1004 to provide the caller with an opportunity to make another menu choice.

If the caller opts to hear a specific topic, the session server 156 begins rendering of that topic in step 1012. After completing that topic, the session server 156 may proceed to the next topic according to the customer's playback preferences, restart the menu mode, etc.

If the session server 156 detects that the caller did not make any response (step 1006) after entering the menu mode, the session server 156 may restart rendering (step 1010), for example by returning to step 710, FIG. 7. Alternatively, if the menu mode had been entered by audio interrupt (FIG. 9), step 1010 may return to the point in the caller's playback where the interruptions occurred and resume playback.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

Additionally, ordinarily skilled artisans will recognize that operational sequences must be set forth in some specific order for the purpose of explanation and claiming, but the present invention contemplates various changes beyond such specific order.

What is claimed is:

1. A method for delivering audio information to telephone callers, comprising operations of:
   upon the occurrence of pre-specified downloading events, continually downloading digital representations of audio and text information concerning predefined topics from content providers into a universal database, said downloading being conducted according to individual customer preferences;
   receiving callers' telephone calls over respective telephone connections;
   performing the following operations responsive to the receipt of each telephone call:
      determining whether the caller has completed a predefined enrollment process;
      only if the caller has completed the enrollment process, performing playback operations comprising:
         retrieving pre-stored preferences specific to the caller, said preferences including content preferences;
         identifying information in the universal database that pertains to the caller's pre-stored content preferences;
         preparing vocalizations of text information present in the identified information;
         audibly presenting the audio information and vocalizations to the caller in predetermined order via the caller's telephone connection.

2. The method of claim 1, the gathering of information from the content providers being conducted via conveyances including at least one of the following: Internet, satellite connection, telephone, dedicated communication lines, postal delivery.

3. The method of claim 1, further comprising performing the predefined enrollment process for one or more persons, comprising the following operations for each person:
   communicating with the person to obtain preferences specific to the person, where said preferences include:
      a predetermined playback order for future audible presentation of information to the person; and
      content preferences within the predefined topics; and
   storing the obtained preferences.

4. The method of claim 3, wherein the communicating operation is performed by the person utilizing a personal computer.

5. The method of claim 1, the operation of audibly presenting the audio information and vocalizations to the caller comprising:
   transmitting the audio information and vocalizations to the caller independent of the Internet.

6. The method of claim 1, the operation of audibly presenting the audio information and vocalizations to the caller comprising:
   transmitting the audio information and vocalizations to the caller via voice telephone call.

7. The method of claim 1, the operation of determining whether the caller has completed the predefined enrollment process including performing a log-in process comprising:
   attempting to identify a telephone number from which the caller originated the telephone connection; and
   responsive to identifying a telephone number from which the caller originated the telephone connection, accessing pre-stored log-in profile data to determine whether the identified telephone number corresponds to an enrolled customer.

8. The method of claim 7, the log-in process further comprising:
    aborting the playback operations unless the identified telephone number corresponds to an enrolled customer.

9. The method of claim 8, the log-in process further including operations of:
    if the identified telephone number does not correspond to an enrolled customer, requiring the caller to manually submit a telephone number, and determining whether the manually submitted telephone number corresponds to an enrolled customer.

10. The method of claim 7, the log-in process further comprising:
    if the identified telephone number corresponds to an existing customer, consulting the log-in profile data to determine security preferences for the caller;
    if the caller's security preferences do not specify expedited log-in, requiring the caller to enter a predefined personal identification code as a condition to starting the playback operations; and
    if the customer's security preferences specify expedited log-in, commencing the playback operations without requiring further action by the caller.

11. The method of claim 1, the operations further comprising:
    during the operation of audibly presenting the audio information and vocalizations, detecting caller interrupt activity including at least one of the following: telephone touchpad key entry, voice command utterance;
    responsive to detection of interrupt activity,
        if the caller interrupt activity has a first predetermined content, changing the order of the audible presentation;
        if the caller interrupt activity has a second predetermined content different from the first predetermined content, aborting the audible presentation and audibly presenting a menu-of options to the caller.

12. The method of claim 1, the operations further comprising:
    designating multiple predetermined touchpad key patterns each pattern including multiple keys;
    during the operation of audibly presenting the audio information and vocalizations, detecting caller entry of a telephone touchpad key; and
    responsive to detection of the telephone touchpad key entry, taking different actions depending upon which predetermined touchpad key pattern contains the entered telephone touchpad key.

13. The method of claim 12, each predetermined touchpad key pattern comprising a column of touchpad keys.

14. The method of claim 1, the operations further comprising:
    during the operation of audibly presenting the audio information and vocalizations, detecting entry of a telephone touchpad key by the caller, the telephone touchpad keys residing in three columns;
    responsive to detection of the telephone touchpad key entry,
    if the entered telephone touchpad key resides within a first one of the touchpad key columns, changing the predetermined order of the audibly presenting audio information and vocalizations to the caller;
    if the entered telephone touchpad key resides within a second one of the touchpad key columns, pausing the audible presentation of audio information and vocalizations until the caller performs a predetermined action; and
    if the entered telephone touchpad key resides within a third one of the touchpad key columns, changing a state of whether the call processing system responds to voice commands uttered by the caller to alter characteristics of the playback operations.

15. The method of claim 1, the operations further comprising:
    responsive to completing the operation of audibly presenting the audio information and vocalizations to the caller, initiating a new performance of the presenting operation.

16. The method of claim 1, the operations further comprising:
    responsive to completing the operation of audibly presenting the audio information and vocalizations to the caller, initiating a new performance of the playback operations.

17. The method of claim 1, the operations further comprising:
    responsive to completing the operation of audibly presenting the audio information and vocalizations to the caller, audibly presenting a menu of options to the caller.

18. A method for delivering audio information to telephone callers, comprising operations of:
    upon the occurrence of pre-specified downloading events, continually downloading digital representations of audio and text information concerning multiple predefined topics from different content providers into a universal database, said downloading being conducted according to individual customer preferences;
    a computerized call processing system receiving callers' telephone calls over respective telephone connections;
    responsive to receipt of each telephone call, the call processing system performing the following operations responsive to the receipt of each telephone call:
    determining whether the caller has completed a predefined enrollment process;
    only if the caller has completed the enrollment process, performing playback operations comprising:
        retrieving pre-stored preferences specific to the caller, said preferences including subject matter preferences;
        identifying information in the universal database that pertains to the caller's pre-stored subject matter preferences;
        preparing vocalizations of text information present in the identified information;
        audibly presenting the audio information and vocalizations to the caller in predetermined order via the caller's telephone connection.

19. A method of delivering audio information to telephone callers, comprising operations of:
    a computerized call processing system receiving callers' telephone calls over respective telephone connections;
    upon the occurrence of pre-specified downloading events, continually downloading digital representations of audio and text information concerning multiple predefined topics from different content providers into a universal database, said downloading being conducted according to individual customer preferences;

responsive to receipt of each telephone call, the call processing system performing the following operations during each telephone call:
- determining whether the caller has completed a predefined enrollment process;
- only if the caller has completed the enrollment process, performing playback operations comprising:
  - retrieving pre-stored preferences specific to the calling customer, said preferences including some subject matter preferences;
  - preparing vocalizations of text information present in the caller service database;
  - audibly presenting the audio information and vocalizations to the caller in predetermined order via the caller's telephone connection.

20. A method rendering audio information delivery services, comprising the following operations performed by an information delivery agency:
- making arrangements for remotely located content providers to supply information of prescribed character;
- upon the occurrence of pre-specified downloading events, continually downloading digital representations of audio and text information concerning multiple predefined topics from different content providers into a universal database, said downloading being conducted according to individual customer preferences;
- individually enrolling a number of customers, the enrollment operation including obtaining preferences of each customer;
- responsive to receiving a telephone call from a previously enrolled customer over a telephone connection,
  - retrieving pre-stored preferences specific to the customer, said preferences including content preferences;
  - identifying information of the universal database that pertains to the customer's pre-stored content preferences;
  - preparing vocalizations of text information present in the identified information;
  - audibly presenting the audio information and vocalizations to the customer in predetermined order via the customer's telephone connection.

21. The method of claim 20, wherein:
the operations further include, prior to retrieving the customer's pre-stored preferences, determining whether the customer has completed the enrollment operation;
the operation of retrieving the customer's pre-stored preferences being performed only if the customer has completed the enrollment operation.

22. The method of claim 20, where the operation of making arrangements for remotely located content providers to repeatedly supply information of prescribed character comprises:
subscribing to one or more news services.

23. A signal-bearing medium tangibly embodying a program of machine-readable instructions executable by a digital processing apparatus to perform a method for delivering audio information to telephone callers, said method comprising operations of:
upon the occurrence of pre-specified downloading events, continually downloading digital representations of audio and text information concerning predefined topics from content providers into a universal database, said downloading being conducted according to individual customer preferences;
detecting receipt of callers' telephone calls, and performing the following operations during each telephone call:
determining whether the caller has completed a predefined enrollment process;
only if the caller has completed the enrollment process, performing playback operations comprising:
retrieving pre-stored preferences specific to the caller, said preferences including subject matter preferences;
identifying information in the universal database that pertains to the caller's pre-stored subject matter preferences;
preparing vocalizations of text information present in the identified information; and
audibly presenting the audio information and vocalizations to the caller in predetermined order via the caller's telephone connection.

24. A logic circuit of multiple interconnected electrically conductive elements configured to perform operations to deliver audio information to telephone callers, the operations comprising:
upon the occurrence of pre-specified downloading events, continually downloading digital representations of audio and text information concerning predefined topics from content providers into a universal database, said downloading being conducted according to individual customer preferences;
detecting receipt of callers' telephone calls, and performing the following operations during each telephone call:
determining whether the caller has completed a predefined enrollment process;
only if the caller has completed the enrollment process, performing playback operations comprising:
retrieving pre-stored preferences specific to the caller, said preferences including subject matter preferences;
identifying information in the universal database that pertains to the caller's pre-stored subject matter preferences;
preparing vocalizations of text information present in the identified information; and
audibly presenting the audio information and vocalizations to the caller in predetermined order via the caller's telephone connection.

25. An apparatus for delivering audio information to telephone callers, comprising:
a digital data storage;
a telephony server configured to receive callers' telephone calls over telephone connections and engage in communications with the callers' via the respective connections;
a content processor coupled to the storage, and programmed to upon occurrence of pre-specified downloading events, continually download digital representations of audio and text information concerning predefined topics from a predefined list of remotely located content providers and placing the downloaded representations in the digital data storage, where the downloading operation is conducted according to individual customer preferences;
an account server coupled to the storage, and programmed to perform a predefined enrollment process including receiving and storing log-in profile data and customer preferences;
a session server coupled to the storage and the telephony server, and programmed to respond to receipt of callers' telephone calls by performing the following operations during each received call:
   determining whether the caller has completed the enrollment process;
   only if the caller has completed the enrollment process, performing playback operations comprising:
      retrieving pre-stored preferences specific to the caller, said preferences including some content preferences;
      identifying information of the universal database that pertains to the caller's pre-stored content preferences;
      preparing vocalizations of at least some of the identified information that comprises text; and
      transmitting the audio information and vocalizations in predetermined order to the telephony server for audible presentation to the user via the caller's telephone connection.

26. The apparatus of claim 25, the storage comprising:
   a first storage containing digital representations of audio sounds; and
   a second storage containing digital representations of textual information and pointers to the digital representations of audio sounds.

27. The apparatus of claim 25, the telephony server being programmed to transmit the audio information and vocalizations to the caller's telephone independent of the Internet.

28. The apparatus of claim 25, the telephony server being programmed to exchange information with the caller via an intermediate telephone network independent of the Internet.

29. The apparatus of claim 28, the intermediate telephone network comprising a wireless telephone network.

30. The apparatus of claim 28, the intermediate telephone network comprising one or more public switched telephone network.

31. A system for delivering audio information to telephone callers, comprising:
   a digital data storage;
   a telephony server configured to receive callers' telephone calls over telephone connections and engage in communications with the callers via the respective connections;
   a content processor coupled to the storage, and programmed to upon the occurrence of pre-specified downloading events, continually download digital representations of audio and text information concerning caller-selected topics from a predefined list of remotely located content providers into a universal database, where the downloading operation is conducted according to individual customer preferences;
   an account server coupled to the storage, and programmed to perform a predefined enrollment process including receiving and storing log-in profile data and customer preferences;
   a session server coupled to the storage and the telephony server, and programmed to respond to receipt of callers' telephone calls by performing the following operations during each received call:
      determining whether the caller has completed the enrollment process;
      only if the caller has completed the enrollment process, performing playback operations comprising:
         retrieving pre-stored preferences specific to the caller, said preferences including some content preferences;
         directing the content processor to construct a caller service database including digital representations of audio and text information particular to the pre-stored preferences of the caller;
         preparing vocalizations of at least some of the text information from the caller service database; and
         transmitting the audio information from the caller service database and the prepared vocalizations in predetermined order to the telephony server for audible presentation to the user via the caller's telephone connection.

32. A system for delivering audio information to telephone callers, comprising:
   storage means for storing digital data;
   telephony server means for receiving callers' telephone calls over telephone connections and engaging in communications with the callers via the respective connections;
   a content processing means coupled to the storage means, wherein upon the occurrence of pre-specified downloading events, continually downloading digital representations of audio and text information concerning predefined topics from a predefined list of remotely located content providers and pre-assembling the downloaded information into the storage means, the downloading being conducted according to individual customer preferences;
   account server means, coupled to the storage means, for performing a predefined enrollment process including receiving and storing log-in profile data and customer preferences;
   session server means, coupled to the storage means and the telephony server means, for responding to receipt of customers' telephone calls by:
      determining whether the caller has completed the enrollment process;
      only if the caller has completed the enrollment process, performing playback operations comprising:
         retrieving pre-stored preferences specific to the caller, said preferences including some content preferences;
         identifying information of the universal database that pertains to the caller's pre-stored content preferences;
         preparing vocalizations of at least some of the identified information that comprises text; and
      transmitting the audio information and vocalizations in predetermined order to the telephony server means for audible presentation to the user via the caller's telephone connection.

33. A computer-driven system for delivering audio information to telephone callers comprising:
   storage means for storing digital data;
   telephony server means for receiving callers' telephone calls over telephone connections and engaging in communications with the callers' via the respective connections;
   content processing means coupled to the storage means, wherein upon the occurrence of pre-specified downloading events, continually downloading digital representations of audio and text information concerning caller-specified topics from a predefined list of remotely located content providers and pre-assembling the downloaded information into the storage means, the downloading being conducted according to individual customer preferences;
   account server means, coupled to the storage means, for performing a predefined enrollment process including receiving and storing log-in profile data and customer preferences;

session server means, coupled to the storage means and the telephony server means, for responding to receipt of callers' telephone calls by:

determining whether the caller has completed the enrollment process;

only if the caller has completed the enrollment process, performing playback operations comprising:

retrieving pre-stored preferences specific to the caller, said preferences including some content preferences;

directing the content processing means to assemble a caller service database including digital representations of audio and text information particular to the pre-stored preferences of this caller utilizing the retrieved pre-stored preferences;

preparing vocalizations of at least some of the text information in the caller service database; and transmitting the audio information from the caller service database and the prepared vocalizations in predetermined order to the telephony server means for audible presentation to the user via the caller's telephone connection.

34. A method of rendering personalized audio content to telephone callers, comprising operations of:

upon the occurrence of pre-specified downloading events, continually downloading information content concerning predefined topics from content suppliers into a universal database, said downloading being conducted according to individual customer preferences;

operating an Internet web server to receive customer content preferences specifying, for each customer, one or more desired topics from a predefined list of topics and, within each topic, one or more desired segments from predefined lists of segments;

responsive to receiving an incoming call from a telephone caller, performing the following operations during the call:

determining whether the caller has previously submitted any customer content preferences;

if the caller has previously submitted customer content preferences, retrieving the caller's content preferences including the specified topics and segments, selecting content from the universal database in accordance with retrieved content preferences, and commencing a process of automatically audibly presenting the selected content in predetermined order to the caller's telephone.

35. The method of claim 34, further comprising:

during the call, varying one or more characteristics of said presenting operation according to audible output of the customer's telephone.

\* \* \* \* \*